D. HARPER.
Plow.
No. 1,734. Reissued Aug. 2. 1864.
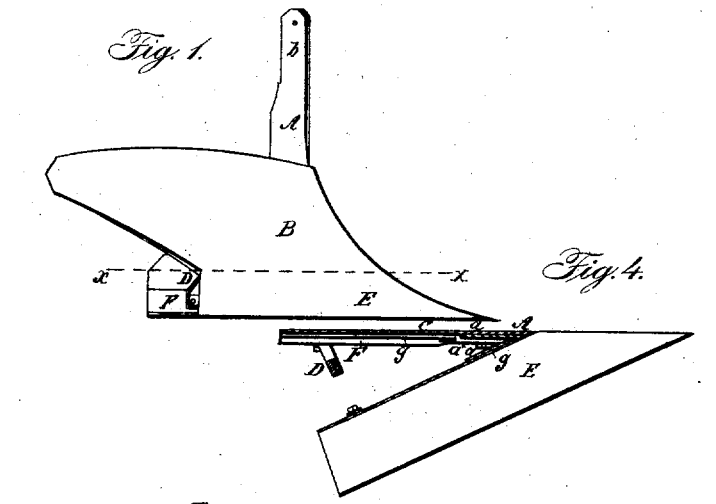
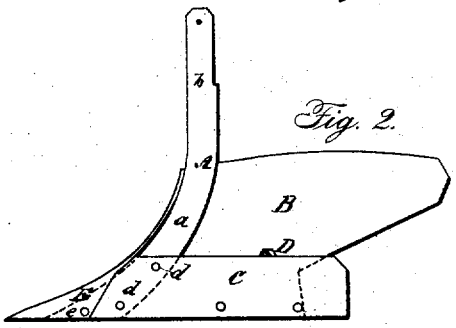
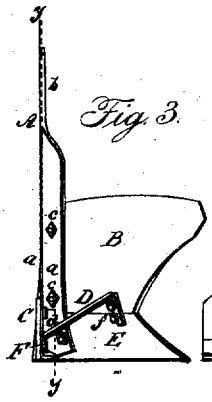
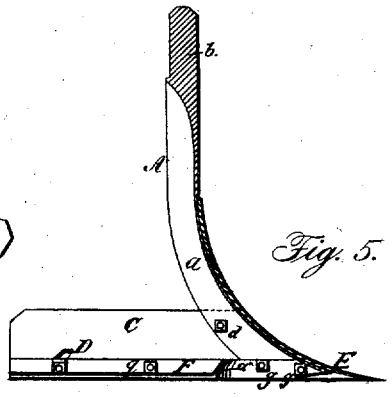
Witnesses:
H. Brooks
Geo. W. Reed
Inventor:
Devaltus Harper
per Munn & Co
Attorneys
AM. PHOTO-LITHO. CO. N.Y. (OSBORNE'S PROCESS.)

UNITED STATES PATENT OFFICE.

DERASTUS HARPER, OF CHICAGO, ILLINOIS.

IMPROVEMENT IN PLOWS.

Specification forming part of Letters Patent No. 36,711, dated October 21, 1862; Reissue No. 1,734, dated August 2, 1864.

*To all whom it may concern:*

Be it known that I, DERASTUS HARPER, formerly of Crystal Lake, but now of Chicago, in the county of Cook and State of Illinois, have invented a certain new and useful Improvement in the Manufacture of Plows; and I do hereby declare that the following is a full, clear, and exact description of the same, reference being had to the accompanying drawings, making a part of this specification, in which—

Figure 1 is a side view of my invention, showing the mold-board side. Fig. 2 is a side view of the same, showing the landside. Fig. 3 is a back view of the same; Fig. 4, a horizontal section of the same taken in the line *x x*, Fig. 1; Fig. 5, a longitudinal vertical section of the same taken in the line *y y*, Fig. 3.

Similar letters of reference indicate corresponding parts in the several figures.

The object of this invention is to obtain a plow which will be extremely light, strong, and durable, have a neat appearance, and be capable of being manipulated with greater ease or less labor than those of ordinary construction.

To this end the invention consists in constructing the plow-standard of angle-iron, providing the landside with an angle-bar, and attaching the share and landside to the standard in a novel way, substantially as hereinafter described.

To enable those skilled in the art to fully understand and construct my invention, I will proceed to describe it.

A represents the standard of the plow, which is of V form in its transverse section, as shown more particularly in Fig. 4. This standard is curved longitudinally, as shown in Fig. 2, and its lower part gradually widened, so as to conform to the shape of the mold-board B and share E. (See Fig. 3.) It is constructed of wrought-iron and formed of two strips or plates, *a a*, of iron welded together at one edge and pressed or swaged into the proper V form; or it may be constructed of a single plate of wrought-iron, brought into the V form by rolling or otherwise, and curved properly by swaging or pressing. This latter mode—viz., constructing it of a single plate—I deem better in practice. The upper parts of the two sides or plates *a a* above the mold-board B are welded together in contact their whole width, so as to form a solid flat portion or bar, *b*, which is designed to pass through the beam of the plow; or, instead of bringing them together, the two sides may be spread apart so as to embrace the beam instead of passing through it, or may be attached to the beam in any other convenient way—it is not material how, though in practice I deem the first mode above described preferable to any other.

The mold-board B may be of the usual form, its front part being secured to the right-hand plate *a* of the standard by two or more bolts, *c*, both of which are shown in Fig. 3, the front edge of the mold-board being flush with or projecting over the front edge or angle of the standard.

C is the landside, the upper and lower edges of which are or may be parallel with each other, as shown in Fig. 2. The front part of the landside is secured to the left-hand plate *a* of the standard by two bolts, *d d*, and the landside and mold-board are firmly braced at their back parts by a bar, D. (Shown in Figs. 3 and 4.)

The share, designated by E, has, like the landside C, its top and bottom edges parallel with each other—that is, at the mold-board side. The front part of the share is curved or bent so as to extend around the lower front part of the standard and be at its left-hand side in the same plane with the landside and abut against the front edge of the latter. The left-hand side of the share is secured to the left plate *a* of the standard by a bolt, *e*. The front edge of the share is curved so as to form a continuation of the curve at the front edge of the mold-board, as shown in Figs. 1 and 2. The back part of the share is also connected to the brace-bar D, as shown at *f* in Fig. 3.

F is a bar which forms a sole for the landside C. This bar or sole is made of wrought-iron, of angle form at its back part, as shown in Figs. 3, 4, and 5, and is secured to the landside by bolts *g*, so that its lower surface will be flush with the lower edge of the landside. The front part of the bar or sole F is curved upward, so as to extend along the lower edge of the left plate *a* of the standard A to its front edge, as shown at $a^{\times}$ in Figs. 4 and 5, and serve as a support to the same.

The mold-board, share, and landside may be of cast-steel and of a greater or less thickness, according to the size of the plow.

It is believed that by this mode of construction a very strong and durable plow will be obtained and the parts be capable of being made light. The standard will be extremely strong, being made of angle or V form, and its strength is greatly increased in consequence of the mold-board, landside, and share being attached to it as shown and described.

Having thus described my invention, what I claim as new, and desire to secure by Letters Patent, is—

1. The standard A, constructed of wrought-iron in angle form, substantially as above set forth.

2. The combination of the above standard with the mold-board B, landside C, and share E, attached to the standard, and all arranged as set forth.

3. The bar or sole F of the landside C, constructed of wrought-iron, in angle form at its back part, turned upward at its front part, and secured to the standard, as shown, for the purpose specified.

In testimony whereof I have hereto subscribed my name, at said Chicago, this 1st day of April, A. D. 1864.

DERASTUS HARPER.

In presence of—

GEORGE PAYSON,
FRANK D. CARLEY.